US011437700B2

(12) United States Patent
Montoya et al.

(10) Patent No.: US 11,437,700 B2
(45) Date of Patent: Sep. 6, 2022

(54) METHODS AND APPARATUSES FOR TUNING A FILTER

(71) Applicant: CACI, Inc.—Federal, Arlington, VA (US)

(72) Inventors: Ryan David Montoya, Arvada, CO (US); Alan Scott Brannon, Denver, CO (US)

(73) Assignee: CACI, Inc.—Federal, Reston, VA (US)

( * ) Notice: Subject to any disclaimer, the term of this patent is extended or adjusted under 35 U.S.C. 154(b) by 675 days.

(21) Appl. No.: 16/510,083

(22) Filed: Jul. 12, 2019

(65) Prior Publication Data
US 2021/0013580 A1    Jan. 14, 2021

(51) Int. Cl.
*H01P 11/00* (2006.01)
*H01P 1/20* (2006.01)
*B23K 26/03* (2006.01)

(52) U.S. Cl.
CPC .......... *H01P 11/007* (2013.01); *B23K 26/03* (2013.01); *H01P 1/20* (2013.01)

(58) Field of Classification Search
CPC .......... H01P 11/007; H01P 1/20; B23K 26/03; G06N 5/003
See application file for complete search history.

(56) References Cited

U.S. PATENT DOCUMENTS 5,198,788 A * 3/1993 Phillips ................. H01P 1/2056
                                                333/207
7,482,890 B2 * 1/2009 Tsuzuki .................. H04B 3/04
                                                333/17.1

* cited by examiner

*Primary Examiner* — Stephen E. Jones
*Assistant Examiner* — Kimberly E Glenn
(74) *Attorney, Agent, or Firm* — BakerHostetler; Tayan B. Patel (57) ABSTRACT

The present application describes a method of tuning a printed device. The method includes measuring a frequency response of a target device and a device under tune (DUT). The method includes computing, based on the measured frequency response, a coupling matrix for the target device and a coupling matrix for the DUT. The method also includes extracting eigenvalues for the coupling matrix of the target device and a first set of eigenvalues for the coupling matrix of the DUT. The eigenvalues of the target device are different than the first set of eigenvalues of the DUT. The method further includes tuning the DUT with a material removal source. The method even further includes measuring a second set of eigenvalues of the DUT. The second set of eigenvalues is different from the first set of eigenvalues of the DUT. The method yet even further includes calculating a tune path for iterative convergence of the second or a subsequent set of eigenvalues of the DUT with the eigenvalues of the target device. The method still even further includes observing the iterative convergence of the DUT and the target device.

20 Claims, 8 Drawing Sheets

METHODS AND APPARATUSES FOR TUNING A FILTER

FIELD

This application is generally related to methods for tuning filters, apparatuses and systems configured to tune filters, and a filter tuned by the aforementioned methods, apparatuses and systems.

BACKGROUND

Generally, large-scale filter production exhibits lot-to-lot or device-to-device performance variations falling outside desired tolerances. Shrinkage of the ceramic block, variations in the ceramic mixture, variations in the furnace firing, thickness variation of the plating, and errors in pattern positioning are all factors in determining a filter's performance. Often, production variations are corrected by tuning each filter.

Filters exhibiting significant coupling among non-adjacent resonators can make post production tuning difficult. Examples of such filters include but are not limited to ceramic monoblock filters and duplexers and recessed top pattern (RTP) monoblock filters and duplexers. Since modifications made to the filter are permanent, each individual tune must be carefully selected.

Moreover, a skilled laborer is required to perform post production tuning. As a result, tuning is inherently expensive. And with a finite group of skilled laborers in any particular region, output can become constrained to meet real-time customer demands.

What is needed is an improved tuning method for filters.

What is also needed is an improved system and apparatus configured to tune filters.

What is further needed is an autonomous method and apparatus for tuning filters.

SUMMARY

The foregoing needs are met, to a great extent, by the invention, with apparatuses, apparatuses, systems and methods for tuning filters.

In accordance with an aspect of this application, a method of tuning a printed device is provided. The method includes a step of measuring a frequency response of a target device and a device under tune (DUT). The method includes a step of computing, based on the measured frequency response, a coupling matrix for the target device and a coupling matrix for the DUT. The method also includes a step of extracting eigenvalues for the coupling matrix of the target device and a first set of eigenvalues for the coupling matrix of the DUT. The eigenvalues of the target device are different than the first set of eigenvalues of the DUT. The method further includes a step of tuning the DUT with a material removal source. The method even further includes a step of measuring a second set of eigenvalues of the DUT. The second set of eigenvalues is different from the first set of eigenvalues of the DUT. The method yet even further includes a step of calculating a tune path for iterative convergence of the second or a subsequent set of eigenvalues of the DUT with the eigenvalues of the target device. The method still further includes a step of observing the iterative convergence of the DUT and the target device.

Another aspect of the application is directed to a system. The system includes a material removal source, a mechanical tuning mechanism coupled to the material removal source, and a computer coupled to the mechanical tuning mechanism. The computer is configured to operate the mechanical tuning mechanism and the material removal source. The computer includes a non-transitory memory having instructions stored thereon for tuning a device under tune (DUT). The computer also includes a processor, operably coupled to the non-transitory memory, configured to execute a set of instructions. The instructions include measuring a frequency response of a target device and the DUT. The instructions also include computing a coupling matrix for the target device and a coupling matrix for the DUT. The instructions further include extracting eigenvalues for the coupling matrix of the target device and a first set of eigenvalues for the coupling matrix of the DUT. The eigenvalues of the target device are different than the first set of eigenvalues of the DUT. The instructions yet even further include positioning the material removal source to a first location of the DUT. The instructions still further include tuning the DUT with the material removal source. The instructions still even further include measuring a second set of eigenvalues of the DUT. The instructions yet still even further include observing an iterative convergence of the DUT and the target device.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

DETAILED DESCRIPTION

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not by other embodiments.

It has been determined by the inventors and described herein that the inventive techniques provide faster processing times and incur less manufacturing costs. For example, it is envisaged by the instant application to describe a technique that simplifies tuning of filters having complicated coupling matrices. More particularly, a robust method for tuning filters by selective use of arbitrary tuning parameters is employed. That is, a resonant structure response to actual and/or simulated response of a target device (TD), preferably a filter device (FD), produces a coupling matrix that is used as a target or goal. Similarly, the device under tune (DUT), preferably a filter under tune (FUT) is also initially tuned, either actually or via simulation, to produce a coupling matrix. Characteristics of the coupling matrices are employed to optimize further tuning iterations of the DUT. Specifically, the eigenvalues of the coupling matrices are identified and employed for subsequent optimization tuning. In an embodiment, eigenvectors can also be employed, either singularly or cumulatively with eigenvalues, to optimize tuning of the DUT. In an embodiment, the eigenvalues and/or eigenvalues of the respective coupling matrices of the TD and DUT through network transfer, reflection polynomials and combinations thereof. It has been proven through inventors' investigations that by making small changes (i.e., arbitrary tunes or predetermined tunes) to the DUT, and measuring the respective changes to the eigenvalues and/or eigenvectors of the coupling matrix, a finite difference approximation to the gradient relationship between each tune and the corresponding eigenvalues and/or eigenvectors may be approximated. For example, Taylor Series expansion may be used.

An iterative procedure is then followed by an error reduction method between the target and current eigenvalues. In other words, the error between the eigenvalues of the TD and DUT is minimized until a minimal solution is obtained. Indeed, the instant application demonstrates convergence on the order of minutes, or shorter. As a result, the techniques and systems envisaged in this application ensure both accurate and efficient results for optimizing resonant structures with complicated coupling networks such as ceramic monoblock filters and RTP filters.

The instant application describes one or more aspects related to the above-mentioned technology. One aspect of the application describes a method for tuning filters. The method reduces processing time and improves device characteristics such as isolation and insertion loss by enabling a design or production DUT to be tuned to a goal defined by the performance of the TD. Another aspect of the application describes a simulation software application executed by a processor. In so doing, tuning data is obtained without physically tuning a DUT. Namely, a tuning path is calculated for iteratively converging the calculated eigenvalues and/or eigenvectors of the DUT's coupling matrix to those of the TD. Yet another aspect of the application describes a tuning apparatus operably coupled to a computer and configured to execute instructions for tuning a filter. The instructions are based on predetermined or measured values obtained through measurement equipment coupled to the computer. The tuning apparatus is also coupled to a mechanical tuning mechanism such as a robotic arm or an ablation laser configured to move the tuning apparatus in relation to a printed filter to perform tuning.

Filters

Filters, and more specifically ceramic filters, are employed in radio equipment to reduce transmission of unwanted energy outside the filter passband. In particular, ceramic duplex filters (i.e. duplexers) including two individual band-pass filters are employed. One filter connects the receiving branch and has a center frequency and bandwidth corresponding to the receiving band. The other filter connects the transmission branch and has a center frequency and bandwidth corresponding to the transmission band.

Conventional ceramic filters include a dielectric ceramic material for the main body upon which metallic materials are applied for producing conducting paths. These paths define the performance of the filter and for realization of pads or other isolated conducting areas that contact the printed circuit board or other interface material.

Ceramic filters generally include a single type of material for all conduction paths, pads and other conductive elements. Typically, conducting-type material is deposited on the device through a process known as electroding. Often, there is a need for soldering or epoxy-attaching given devices to a printed circuit board. The strength of the conducting bond between a device and the board requires using a conducting material containing glass frit material in combination with pure silver conductive material. Generally, a pattern of metallized and un-metallized areas is defined on a filter. The pattern includes a recessed area of metallization that covers at least a portion of the top surface and areas which cover the bottom and side surfaces, the through-holes, and at least a portion of the walls or posts.

Figure 1:
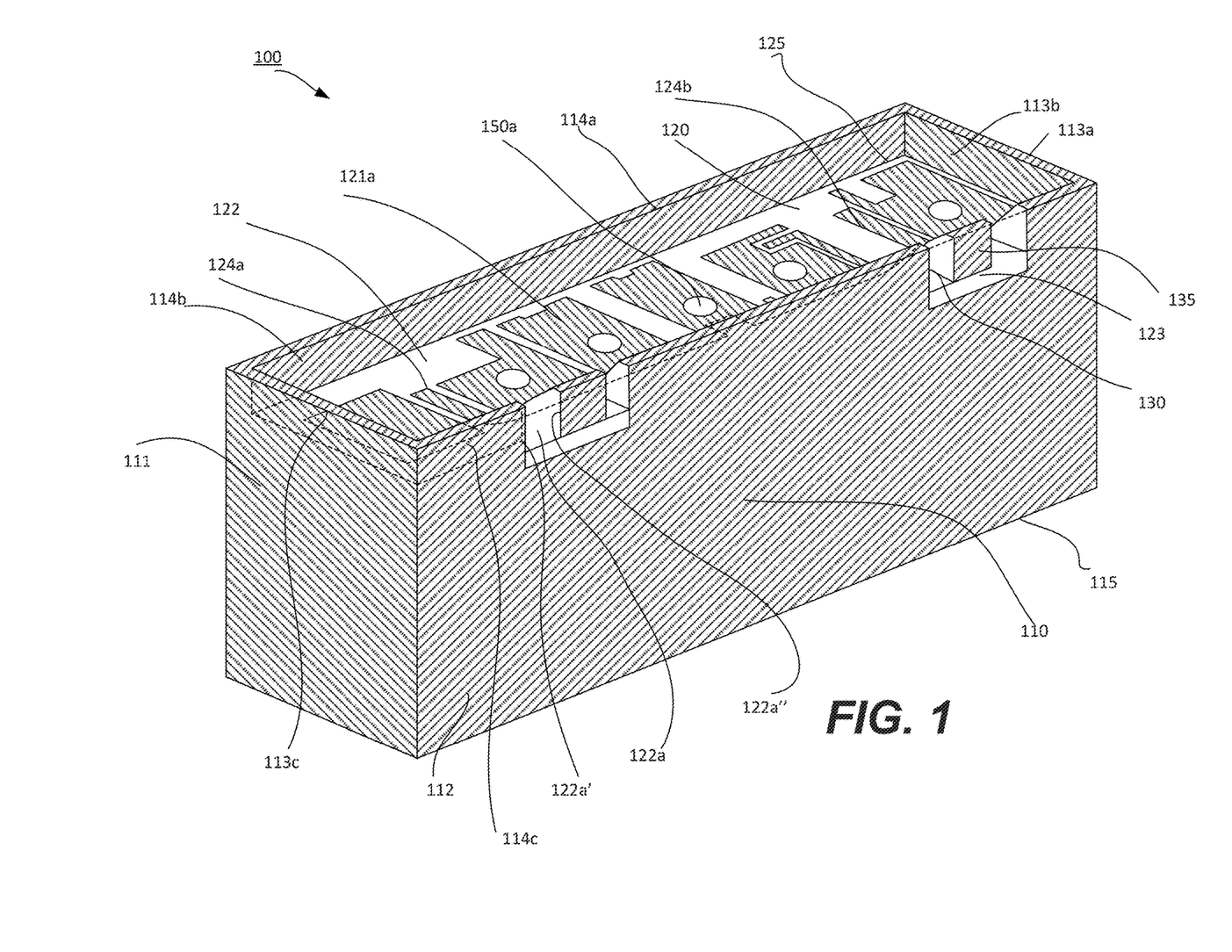
FIG. 1 illustrates a ceramic filter according to an aspect of the application.

FIG. 1 illustrates a radio frequency (RF) filter 100 according to an aspect of the application. The filter may be formed in any shape. In an exemplary aspect, core 110 includes a ceramic dielectric material having a desired dielectric constant.

The filter 100 includes four side surfaces. Two of the four side surfaces are minor side surfaces 111. The other two of the four side surfaces are major side surfaces 112. The filter 100 also includes a bottom surface 115 and a top-recessed surface 120 making the filter a recessed-top portion (RTP) type filter. The top surface 120 is generally parallel and opposed to the bottom surface 115. Once fabricated, the top surface 113a of walls 113 and top surface 114a of walls 114 are attached to a printed circuit board (not shown), and, therefore, top surface 120 is not easily accessible to a filter tuner.

The filter 100 also includes four generally planar walls that extend upwardly from the top surface 120. In one embodiment, the planar walls extend upwardly and/or outwardly along a perimeter of the top-recessed surface 120. In another aspect, the planar walls are unitary portions of the major 112 and minor 111 side surfaces. Planar walls of the minor side surfaces are 113, and planar walls of the major side surfaces are 114.

Walls 113, 114, and top surface 120 define a cavity 125. Top surfaces 113a of walls 113 and top surfaces 114a of walls 113 also define a peripheral rim 115 of a predetermined thickness. The thickness of the roof is dependent upon the width and length of the cavity 125.

Inner walls 113b of walls 113 of the minor surface 111, inner walls 114b of walls 114 of the major surface 112, and the top surface 120 can be plated or deposited with a first coating.

In an aspect, outer walls 113c and 114c of walls 113 and 114 are coextensive and coplanar with major 111 and minor 112 surfaces, respectively. In one aspect, the roof 113a, 114a are planar. In another aspect, the roof slopes downward from the inner to outer surfaces of the walls 113, 114. In yet another aspect, the roof slopes upward from the inner to outer surfaces of the walls 113, 114. The slope is envisaged to be any angle.

As shown in FIG. 1, planar walls 114 includes plural, spaced-apart slots 130. For example, the slots extend through the planar walls 114 from the inner 114b to the outer 114c surface. The slots 130 may have similar or different lengths extending between two minor side surfaces 111. In an aspect, a post 135 may be formed in the planar walls 114 between two spaced-apart slots 130. The plural posts 135 may have similar or different lengths.

The top surface 120 may include plural through-holes 150. The through-holes 150 extend from the top surface 120 to the bottom surface 115 (not shown) of the body 100. The through-holes 150 act as resonators. The through-holes are metallized. In an aspect, the through-holes 150 are aligned in a spaced-apart, co-linear relationship and are also equal distances from the side surfaces. Each of through-holes 150 is defined by an inner cylindrical metallized side-wall surface.

Top surface 120 additionally defines a surface-layer recessed pattern of electrically conductive metallized 121 and insulative, un-metallized 122 areas or patterns. The metallized areas 121 are preferably a surface layer of conductive silver-containing material. Recessed pattern 121 defines a wide area or pattern of metallization that covers the surface. In an embodiment, the recessed pattern 121, through-holes 150, and inner walls 113b, 114b are deposited with a first coating including a metal and frit. More specifically, the metal is a precious metal. Even more specifically, the metal is silver (Ag).

Meanwhile, the bottom surface 115, side surfaces 111, 112, outer planar walls 113c, 114c, and top rim 113a, 114a are deposited with a second coating including a metal and frit. The metal may be precious. In particular, the metal is silver. The frit content in the second coating is greater than the first coating. In an aspect, the frit content is at least 20% greater in the second coating. The first coating also extends contiguously within the through-holes 150 from the top surface 120 to the bottom surface 115.

In an aspect, a portion of metallized area 121 is present in the form of resonator pads 121a, 121b, 121c, 121d, 121d, 121e and 121f (121a is representative). Each of these resonator pads partially surrounds a through-hole 150 (150a-150f) opening located on the top, recessed surface 120. In an exemplary aspect, each resonator pad entirely surrounds one of through-holes, respectively. The resonator pads are contiguous with the metallization area 121 that extends through the inner surfaces of the through-holes. Resonator pads 121a-f are shaped to have predetermined capacitive couplings to adjacent resonators and other areas of surface-layer metallization.

An un-metallized area or pattern 122 extends over portions of top surface 120. Un-metallized area 122 surrounds all of the metallized resonator pads 121a-f. In addition, portions of inner planar walls 113b, 114b and roofs 113a, 114a are un-metallized.

Un-metallized area 122 extends on the top surface 120 in slot 122a (122a is representative of slots 122b, 122c and 122d. The un-metallized area 122 also extends onto side wall slot portions 122a', 122a", 122b', 122b", 122c', 122c", 122d' and 122d" (122a' and 122a" are representative). Side wall slot portions 122a' and 122a" define opposed side walls of the post 135.

In another aspect, un-metallized area 122 also can also extend onto a portion 123 of side surface 112 located below the post 135. Portion 123 can also extend below the slots 130. These un-metallized areas co-extensive or joined or coupled with each other in an electrically non-conducting relationship.

The surface-layer pattern of the filter 100 additionally defines a pair of isolated conductive metallized areas 124a, 124b for input and output connections to filter 100. An input connection area or electrode 124a and an output connection area or electrode 124b are defined on top surface 120 and extend onto a portion of the planar walls 114 and side surface 112. The electrodes can serve as surface mounting conductive connection points or pads or contacts. Electrodes 124a, 124b are located adjacent and parallel to side surfaces 111.

Each of the electrodes is located between two resonator pads 121a-f. Electrodes 124a, 124b are surrounded on all sides by un-metallized areas 122.

In another aspect, the recessed surface pattern 120 includes metallized 121 areas and un-metallized 122 areas. As a result, metallized areas are spaced apart from one another and capacitively coupled. The amount of capacitive coupling is roughly related to the size of the metallization areas and the separation distance between adjacent metallized portions as well as the overall core configuration and the dielectric constant of the core dielectric material. Similarly, surface pattern 120 also creates inductive coupling between the metallized areas.

Figure 2:
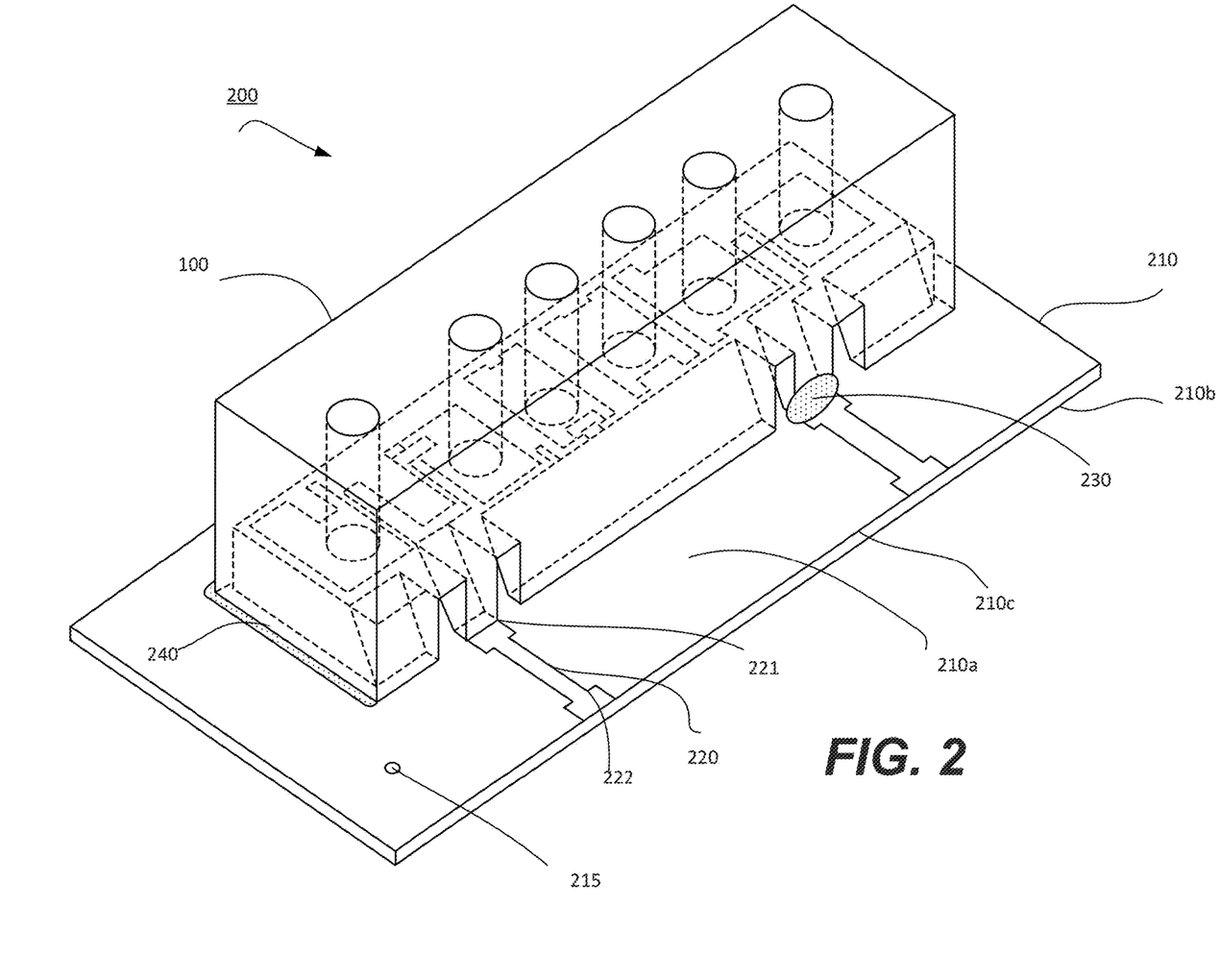
FIG. 2 illustrates printed circuit board on which the ceramic filter is attached according to an aspect of the application.

According to another aspect, the filter 100 is illustrated as being mounted to a generally planar rectangular shaped circuit board 210 in FIG. 2. In one aspect, circuit board 210 is a printed circuit board having a top or top surface 210a, bottom or bottom surface 210b and sides or side surfaces 210c. Circuit board 210 has a height of a predetermined thickness. Circuit board 210 also includes plated through-holes 215 that form an electrical connection between the top and the bottom of the circuit board 210. Several circuit lines 220 and input/output connection pads 221 can be located on top the top surface and connected with terminals 222. Circuit lines 220, connection pads 221, and terminals 222 can be formed, for example, from metal such as copper. Terminals 222 connect the filter 100 with an external electrical circuit (not shown).

A post of the filter 100 can be attached to the PCB 200 at the connection pad(s) 221 by solder 230. In an aspect, one or both of the input 124a and output 124b electrodes can be attached to the solder 230.

Circuit board 200 has a generally rectangular-shaped ground ring or line 240. It can be disposed on the top surface. The line 240 can be formed around the rim of the filter. The ground ring can be formed from copper. Next, the filter 100 can be placed on top 302 such that input electrode portion 124a and output electrode portion 124b are aligned with connection pads 221. Circuit board 200 and filter 100 may be arranged in a reflow oven to melt and reflow the solders.

As illustrated in FIG. 2, filter 100 is mounted to the board 200 in a top side down relationship. As a result, the top surface 120 is located opposite, parallel to, and spaced from the top 210 of board and the rim of 113a, 114a of the filter are soldered to the top of the PCB 200. In this relationship, cavity 125 is partially sealed to define an enclosure defined by the top-recessed surface 120, the board surface 210a, and the walls 111, 112 of the filter. It is further noted that, in this relationship, the through-holes in filter are oriented in a relationship generally normal to the board 200.

The use of filter 100 with recessed top surface pattern 120 facing and opposite the board provides improved grounding and off band signal absorption, and confines the electromagnetic fields within cavity 125. The arrangement also prevents external electromagnetic fields outside of cavity 125 from causing noise and interference such that the attenuation and zero points of the filter are improved. The technology allows the same footprint to be used across multiple frequency bands. In addition, during solder reflow, filter 100 tends to self-align with the ground ring 240 on the circuit board.

The use of a filter 100 defining a cavity and a recessed top surface pattern 40 facing and opposite the board 200 eliminates the need for a separate external metal shield or other shielding as currently used to reduce spurious electromagnetic interference incurred. However, this means any tuning to be carried out for the filter 100 after attachment to the board 200 cannot be carried out on the top-recessed surface 120 unless the whole filter 100 is taken off the board 200.

Accordingly, the better the filter 100 is designed, fabricated, characterized, and/or tuned prior to attachment to the board 200, the more reliable and cost-efficient the overall operation and use of the filter 100 becomes. Various aspects of this application address these issues and provide efficient and fast methods and systems to design, tune and produce such ceramic filters.

Systems and Apparatuses for Tuning Filters

Figure 3:
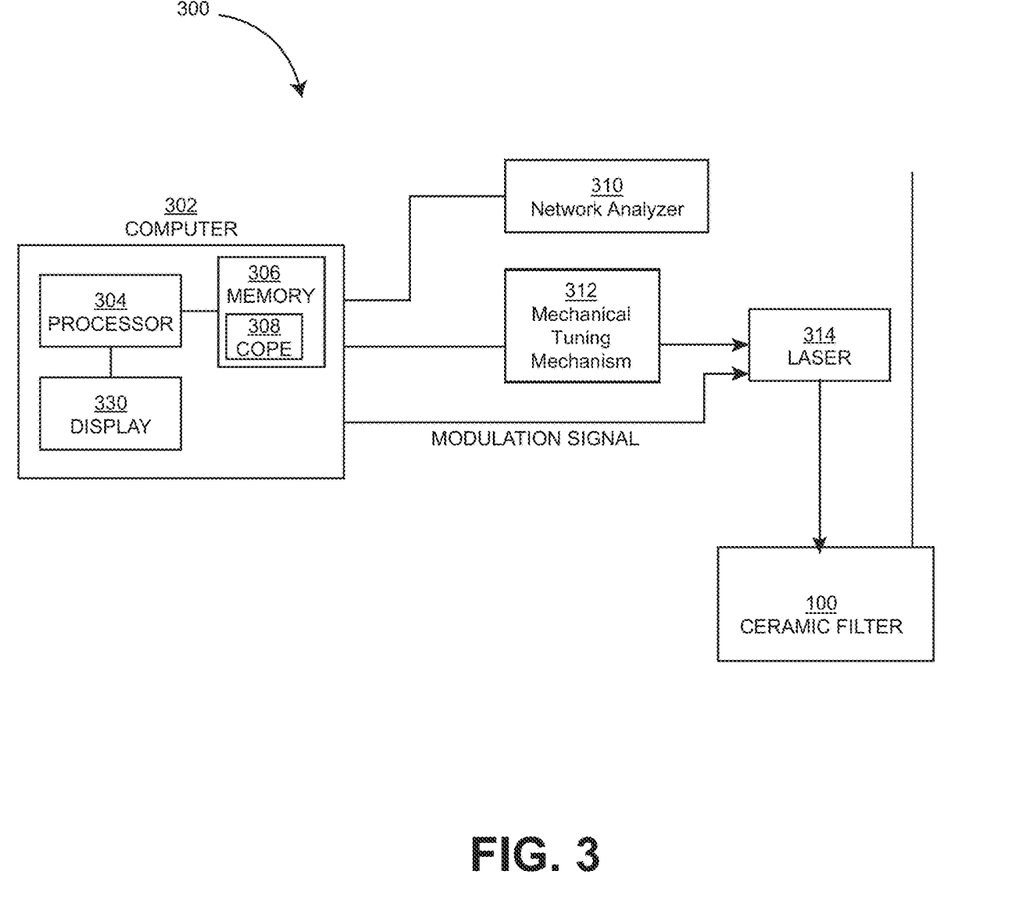
FIG. 3 illustrates a system according to an aspect of the application.

Referring to FIG. 3, a system 300 for laser-based tuning of ceramic filters is provided, in accordance with an aspect of this disclosure. The system 300 includes a computer 302, a network analyzer 310, mechanical tuning mechanism including a robotic arm or other operating device for tuning 312, and a laser 314. The computer 302, the network analyzer 310, the robotic arm 312, and the laser 314 are all configured to design, tune and/or produce a tuned ceramic filter, e.g., the filter 100. All components shown in FIG. 3 are shown separately, however it is envisaged in this application that a single structure housing all components is tenable.

The computer 302 includes a processor 304. A memory 306 is coupled to the processor 304, the memory 306 having non-transitory computer readable medium (COPE) 308 on which are stored instructions/computer code for laser tuning a recessed top ceramic filter, e.g., the filter 100. The instructions when executed by the processor 304 cause the processor 304 to carry out a simulation, design, characterization, tuning and production of the filter 100. The computer 302 is specially configured to carry out these aspects of the present application, as will be understood by one of ordinary skill in the art in view of this application.

In one aspect of this application, the computer 302 is coupled to a network analyzer 310 configured to provide a frequency domain and/or a time domain response of the filter 100 to various signals (e.g., electrical or mechanical test signals) to characterize and test the filter 100. Alternatively, the network analyzer 310 may be part of the computer 302. The network analyzer 310 is configured to obtain the coupling matrices of the TD and DUT. In an embodiment, the network analyzer 310 also calculates eigenvalues and/or eigenvectors.

In one aspect of this application, the computer 302 is coupled to and/or in communication with a mechanical tuning mechanism, such as robotic arm 312. The robotic arm312, and in some aspects a steerable mirror, facilitates movement of the laser 314 in reference to ceramic filter 100. Namely, the computer 302 may send control signals to move the robotic arm 312, and in turn the laser 314, to one or more precise locations on the filter 100. The computer 302 may then send additional control signals to the laser 314 for outputting laser pulses on to the precise locations on the filter 100 where the ceramic material is to be removed.

In an alternative embodiment, the robotic arm 312 may be optional, and the laser 314 may be positioned manually above a desired location on the filter 100. Still alternatively, the laser 314 may be static, and instead the filter 100 may be moved using the robotic arm 312. Further, in one aspect, both the laser 314 and the filter 100 may be moveable by the robotic arm 312 to ensure a precise orientation relative to each other.

In one aspect of this application, the material removal source, preferably a laser 314 is a femto-second pulsed laser. The femto-second pulsed laser can emit optical pulses on the order of 1 femto-second duration. These pulses are less than about 1 pico-second in duration.

An exemplary advantage of this duration is that the ceramic material on the filter 100 is ablated but does not burn off or overheat the filter 100. In yet another aspect of the application, non-pulsed laser or a laser with a pulse duration of about 1 pico-second or longer can be employed. Another exemplary advantage of using laser 314 is that a high degree of precision removal of the tune material (ceramic material) is possible.

Methods for Tuning Filters

Figure 4:
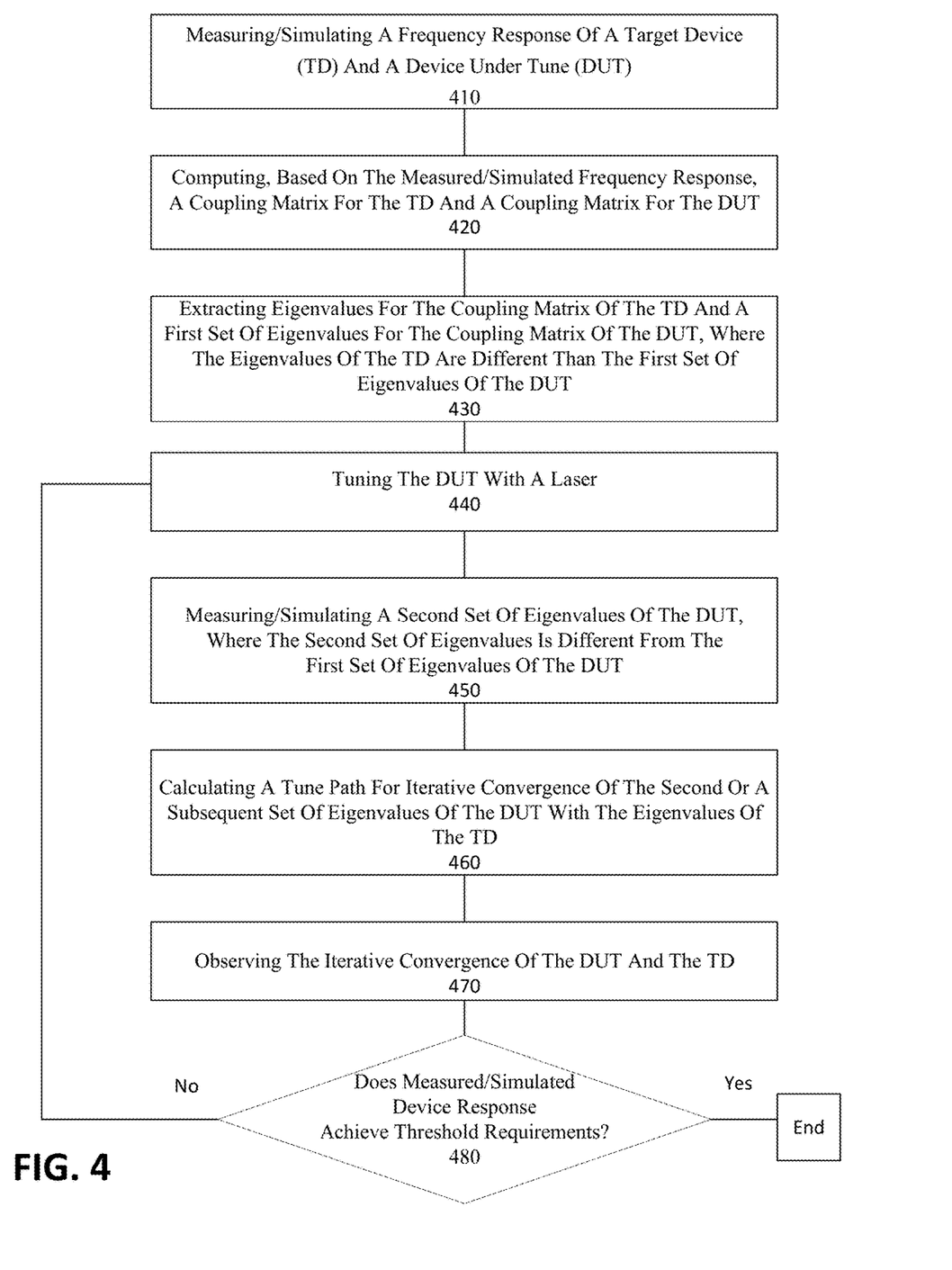
FIG. 4 illustrates a tuning method according to an aspect of the application.

In one aspect of the application, methods for tuning filters are described as envisaged by the inventors. FIG. 4 illustrates an exemplary embodiment of this aspect. In this aspect, the filter preferably is a printed filter. The process 400 operates on the printed filter, including a ceramic RTP duplex filter (duplexer), e.g., the filter 100. To carry out the iterative design process 400, various pieces of information are taken into consideration such as: (i) design data describing achievable electrical performance of the finished component. (i.e., simulated S-parameters of a designed filter, or measured S-parameters of a previously fabricated known-good filter); (ii) an initial engineering estimated design of the printed pattern of the DUT; (iii) the ability to simultaneously measure and tune the filter, or the ability to go between measurement and tune steps in quick succession; (iv) the computer 302 for running software for calculations; and (v) means of displaying calculated results (e.g., the display 330).

In one embodiment, a first step 410 includes simulating or measuring the TD, e.g. filter 100. This results in an accurate prediction of the final DUT performance, e.g., electrical frequency response, from a measured existing product (a previously characterized ceramic filter). The optimal standard may include storing, in the memory 306 and the computer 302, electrical characteristics of the TD matching the design goals, with eigenvalues of the coupling matrix derived from the s-parameters of the filter. The instant technology in at least one embodiment diverges from conventionally known techniques where the designer typically employs a laborious and expensive process that requires significant knowledge of the art to design and tune the printed pattern on a filter to yield results similar to the originally simulated performance.

Separately, the frequency response of the DUT/FUT is also measured in Step 410. The frequency response observed by the DUT is indicative of a maximum disparity with the frequency response of the TD. It is desired in this application to under-tune versus over-tune, as for filters similar to 100, it is easy to remove material (negative tuning) but difficult to add material (non-negative tuning). This helps ensure there are no non-negative tuning steps employed.

According to Step 420, a coupling matrix is computed based on the measured/simulated frequency response of the TD and DUT. Specifically, to optimize the resonant filter response, it is necessary to represent the response in terms of fundamental objective parameters. For filters formed by a coupled resonant structure, it is sufficient to optimize both the resonant center frequencies and resonator cross couplings. The coupling matrix reflects these properties, being a symmetric matrix, typically derived from the transfer and reflection polynomials of a measured resonant network. The polynomials and corresponding folded form coupling matrices may be derived using existing software or mathematical methods. Each index of the coupling matrix corresponds to the self- or cross-coupling between resonators. For example, the diagonal represents the self-coupling of each resonator, and the off-diagonal elements correspond to cross couplings.

The coupling matrix is often used to reflect the physical topology of a system. Traditional methods of coupling matrix synthesis result in a folded or canonical form that is representative of the eigenvalues or characteristic poles of the transfer and reflection polynomials, but this canonical form typically does not directly correspond to the topology of the physical filter. Further symmetry rotations that preserve the eigenvalues are required to force the coupling matrix into a physical topology, i.e., a topology matching the physical filter.

For a generalized optimization solution, a positive-definite or fully coupled structure must be considered. Such a structure cannot easily be realized into a correct physical topology due to insufficient constraints on the filter topology as distantly non-adjacent resonators are often significantly coupled to each other, e.g. in filters similar to filter 100. It is therefore impractical to pursue a physical topological form of the coupling matrix.

In Step 430 of FIG. 4, only the eigenvalues (and perhaps also the eigenvectors) of the coupling matrix of the network, are extracted and will be used to find the proper tune(s) and amount of tune(s), regardless of topology or form. In an embodiment, the eigenvalues have the same dimensionality as the number of resonators present in the network, with the addition of two corresponding to the input and output ports if the full coupling matrix is used. As shown in FIG. 4, Step 430 indicates the eigenvalues obtained for the TD are different from the first set of eigenvalues of the DUT.

In an embodiment, the coupling matrix is synthesized from the S-parameter polynomial roots and residues of the characteristic polynomials. Moreover, normalized resonant frequencies are the coupling matrix eigenvalues. Symmetry rotations preserve eigenvalues. Symmetry rotations alter physical interpretation of the system. This is observed in the equations below:

$M = UAU^T$ (Spectral Decomposition)

$M' = (RU)A(U^TR^T)$ (Symmentry Rotation by $R$)

$M' = QAQ^T, Q, U, R, \in O(n)$ (Orthogonal Group)

According to another embodiment of this aspect, the nonlinear optimization objective is to:

$$\underset{x}{\text{minimize}} \ \frac{1}{2}\|g(x) - \lambda\|_F^2$$

subject to $x \geq 0$

In particular, x should be monotonically increasing when applied to a physical system outside of a simulation. Care should be taken not to overshoot the objective. Moreover, in the formulas below, N is the number of resonators plus two, and K is the length of the tune vector, where $g(x) \in RN$ is the nonlinear function of the input tune vector, $x \in RK$. And further, the target $\lambda$ is the vector of normalized frequencies, and $g(x)$ returns the eigenvalues of the new system.

According to an embodiment to optimize the system, the response of the eigenvalues to arbitrary tunes must be found in order to predict the next iteration. The function relating arbitrary tunes to eigenvalues is not necessarily realizable analytically, and so must be evaluated by numerically exploring the input set space. A tune may consist of removing metal on pad geometries of a given filter, and each tune is assumed to be irreversible. In an aspect, the skilled person can image the detuned filter and simulate its shape/pattern in an electromagnetics simulation tool such as HFSS. By doing so, the simulated pattern can be tuned using the above objective (x>=0), where it is allowable to reverse overshoot (but negative tunes still may not be applied). After tuning the simulation, the real pattern can be cut to match the simulation. Therefore, when parameterizing the tunes, only non-negative values belong to the solution set. Indeed, a given tune cannot be undone. Therefore, the value of the next iteration of x must be greater than the previous iteration, $(x_i \geq x_{i-1})$. This is if the tunes take place on a physical device, and not in simulation. Additionally, there may be an arbitrary number of tunes applied, and at least some dependence among all variables is likely.

The function representing the eigenvalue-tune relationship is a multi-variable vector-valued function accepting multiple tunes and returning a vector of eigenvalues. Generally, derivative-free optimization is employed. In some aspects, derivative free optimization methods can be used that include constraints $(x_i \geq x_{i-1})$ or $(x_i \geq 0)$. Hyperparameter tuning to avoid overshoot will be necessary for these methods.

In a particular embodiment of derivative-free optimization, in each iteration of the optimization routine, a small change is applied to each of the variables, or tunes. The resulting difference in coupling matrix eigenvalues is an Euler approximation of the derivative of each eigenvalue with regards to the variable changed. Because each tune is a composition of itself and all previous small tunes, the derivative must be approximated by using the resulting tuned eigenvalues minus the previous resulting tuned eigenvalues. The assembly of the derivative vectors into a matrix yields the Jacobian, and from its synthesis, a 1st order Taylor Series approximation can be made at each interval. Solving the resulting hyperplane for the non-negative linear least-squares error to the target eigenvalues yields the optimal tune vector, which may then be implemented on the physical structure, and the process repeated.

In an embodiment, with respect to eigenvalue sorting, the difficulty in optimizing by eigenvalue is that specific association of eigenvalues must be known in order to perform a correct optimization step. For example, for two square matrices A and B of dimension N by N, the eigenvalues easily can be computed and returned in any particular order. Typically, they are sorted in order of largest to smallest magnitude. Measuring the mean square error between the eigenvalues of A and B, however, is dependent on the sorting. If A is the coupling matrix of a detuned filter, and B the matrix of the target or desired filter coupling, then the first eigenvalue of A may correspond to the second resonance while the first eigenvalue of B may correspond to the first resonance. This can happen if the first and second resonances are close in frequency, and the filter is sufficiently detuned. If the eigenvalues are sorted by magnitude and the error is measured by mean-square error, then the resulting gradient step will move the first resonator of A towards the second resonator resonance.

Instead, according to this application, it is envisaged to compare the correct resonators, which requires associating eigenvalues between current and target matrices. To do so, a small change can be applied locally to each resonant cavity (for ceramic filters), and the change in eigenvalues is measured for each change. The eigenvalue with the largest change should correspond to the resonator with the local change applied. Then, the error between this eigenvalue and its target resonance/eigenvalue can be correctly measured. A small change may consist of inserting a dielectric column into the air cavity of a specific resonator and measuring the eigenvalues before and after inserting the column. Alternatively, small tuning cuts on oversized printed structures 121 can be made by a laser for this purpose.

This could be performed before each tuning step or merely at initialization of the procedure. If performed only once, the eigenvalues must be carefully sorted according to each iteration (prior value and new value) to prevent eigenvalue swapping/crossover. The eigenvectors can also be used to ensure proper sorting, via sorting by "rotational" distance to the target eigenvalues and/or previous eigenvalues.

According to Step 440 in FIG. 4, the FUT/DUT is tuned with a laser tool. Removal of the ceramic material may be performed for the filter 100 using the laser 314 for precise removal. Alternatively, for coarser removal during initial iterations, a drill cutter may be used. Selection of which resonator(s) or coupling(s) should be tuned first and which should be tuned next and so on may be performed by the computer 302 using multiple transformations of the data to correctly determine each resonator frequency and each coupling value, due to the interrelationships among these items. A property to tune is chosen by comparison of the filter 100 under design to a reference filter.

In Step 440 in FIG. 4, removal of material at the calculated locations and in the calculated amount are carried out by the laser 314 following the guided computer executable instructions given by the computer 302. Alternatively, a technician may perform such removal using instructions and numerical values from the computer 302.

According to the application, each tune vector requires a cut in the surface metal artwork. Since the cut cannot be undone, x≥0 only if 0 is the reference for the last iteration of x. In one embodiment, the constraint is $(x_i \geq x_{i-1})$. While the non-negative constraint is still valid, it is only strictly true in the physical tuning case if at every step the next tune is referenced to $x_{i-1}=0$.

According to Step 450 in FIG. 4, measurement and comparison of the filter 100 against the TD and against other design goals (possibly in the frequency domain) is performed. Namely, a second set of eigenvalues of the DUT is measured after tuning. The second set of eigenvalues are observed to be different than the first set of eigenvalues of the FUT. In a more specific embodiment, Step 450 may be split into the following sub-steps, including (i) measuring/simulating a second frequency response of the DUT; (ii) computing, based on the second frequency response, a second coupling matrix for the DUT; and (iii) extracting a second set of eigenvalues for the coupling matrix of the DUT.

Optionally, Step 460 of FIG. 4 includes calculating a tune path for iterative convergence of the second or a subsequent set of eigenvalues of the DUT with the eigenvalues of the target filter. That is, if convergence occurs after initial tuning, a tune path typically is not required for further tuning of the instant DUT.

According to an embodiment, optimization can be carried out using a finite difference. Here, g(x) is a nonlinear, intractable function where only inputs and outputs can be observed. Moreover, the first derivative is modelled using a finite difference approximation (forward-difference), where:

$$\frac{dg_i(x_o)}{dx} \approx \frac{g_i(x_o + x_p) - g_i(x_o)}{x_p}$$

And since g(x) maps a vector of length K to a vector of length N, the Jacobian is employed for the full gradient as follows:

$$\nabla g(x) = \begin{bmatrix} \frac{\partial g_1}{\partial x_1} & \cdots & \frac{\partial g_1}{\partial x_K} \\ \vdots & \ddots & \vdots \\ \frac{\partial g_N}{\partial x_1} & \cdots & \frac{\partial g_N}{\partial x_N} \end{bmatrix} \in \mathbb{R}^{N \times K}$$

According to another aspect of the above-mentioned embodiment a least squares (non-negative) step algorithm is employed to compute the next iteration. This aspect is not forward only, unless at each step the last sample is used to rest the reference of 0. The least squares step algorithm is shown below:

---

Algorithm 1: Non-negative Least Squares Steps

---

Data: Step $0 < L < 1$, threshold $\tau$, target vector $\lambda \in \mathbb{R}^N$, interations M, threshold $\in$
Result: Minimizing vector x*
Initialize: $x_k = 0 \in \mathbb{R}^K$;
for k = 1, 2, . . ., M do
| J = $\nabla g(x_k)$;
| $x_{k+1}$ = L · lsqnonneg(J, $\lambda - g(x_k)$);
| if $|x_{k+1} - x_k| \leq \in$ or $g(x_k) \leq \tau$ then
| |break;
| else
| | $x_k = x_{k+1}$;
| | continue;
| end
end

--- x* = $x_k$

According to yet another embodiment, a Gradient Descent algorithm is employed as follows:

---
Algorithm 2: Forward-Only Gradient Descent
---

Data: Lipschitz constant L, threshold τ, target vector $\lambda \in \mathbb{R}^N$,
   iterations M, threshold $\in$
Result: Minimizing vector x* to objective $f(x) = \frac{1}{2}\|g(x) - \lambda\|_2^2$
   subject to $x_{k+1} \geq x_k \geq 0$
Initialize: $x_k = 0 \in \mathbb{R}^K$;
for k = 1, 2, . . ., M do
|$\nabla f(x_k) = \nabla g(x_k)^T(g(x_k) - \lambda)$;
|$x_{k+1} = \max(x_k - L \cdot \nabla f(x_k), x_k)$;
|if $|x_{k+1} - x_k| \leq \in$ or $f(x_k) \leq \tau$ then
| |break;
|else
| |$x_k = x_{k+1}$;
| |continue;
|end
end

---

$x^* = x_k$

In the Gradient Descent algorithm, linear convergence may require many iterations.

According to yet another embodiment, a Broyden-Fletcher-Goldfarb-Shanno (BFGS) algorithm is employed. In this algorithm, a Quasi-Newton method is employed whereby the Hessian is approximated for faster convergence. The BFGS technique requires more computation per step than the Gradient Descent algorithm. However the BFGS technique exhibits super linear convergence with far fewer iteration than the Gradient Descent algorithm.

The BGFS technique exhibits fast convergence (super linear). Convergence to local minima is guaranteed with precise tuning. However, there is the risk of overshoot.

According to a further embodiment, if the device/filter 100 passes the requirements from one of the above-mentioned techniques, the process 400 is complete. In an embodiment, step 480 inquires whether the device measured device response achieve threshold requirement. For example, does the difference between the tune vector of the device 100 and the simulated tune vector may converge to zero? If the answer is yes, the process ends. On the other hand, if the answer is no the iterative approach is followed by returning to Step 440. For example, Steps 440-470 are iteratively repeated for modifying the simulated data and the amount of the ceramic material removed such that the tune vector and the simulated tune vector match.

Figure 5:
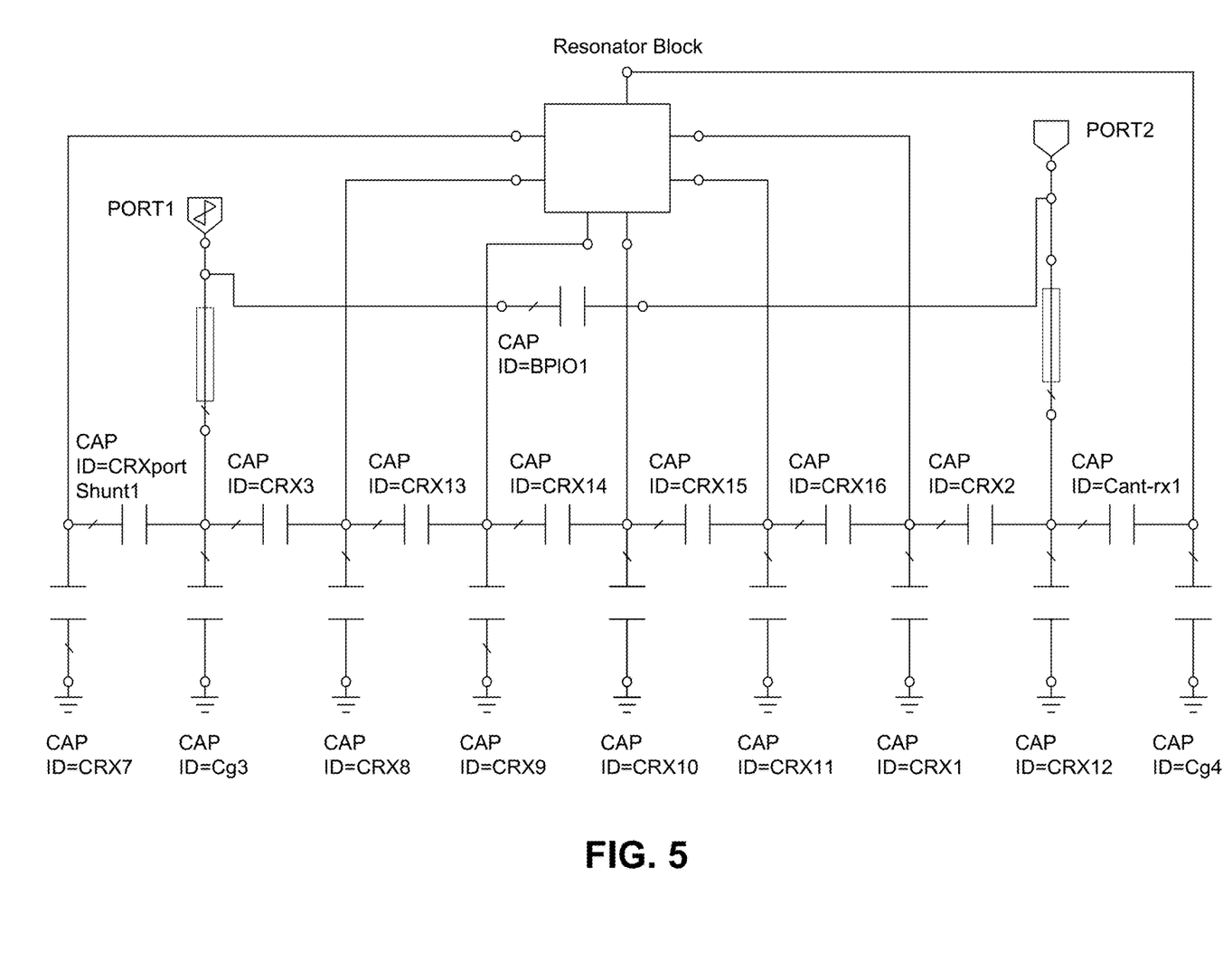
FIG. 5 illustrates a simulation of the ceramic filter response according to the application.

FIG. 5 depicts a simulation of the ceramic filter response. Here, a capacitor network is employed as variables that may be tuned during optimization. A block is generated using HFSS that captures the resonant structures. In an exemplary embodiment as depicted in FIG. 5, capacitors CRX13 and CRX14 are placed in a detuned state, and then iteratively optimized using the resulting s-parameter outputs. Selection of these capacitors is arbitrary.

Figure 6:
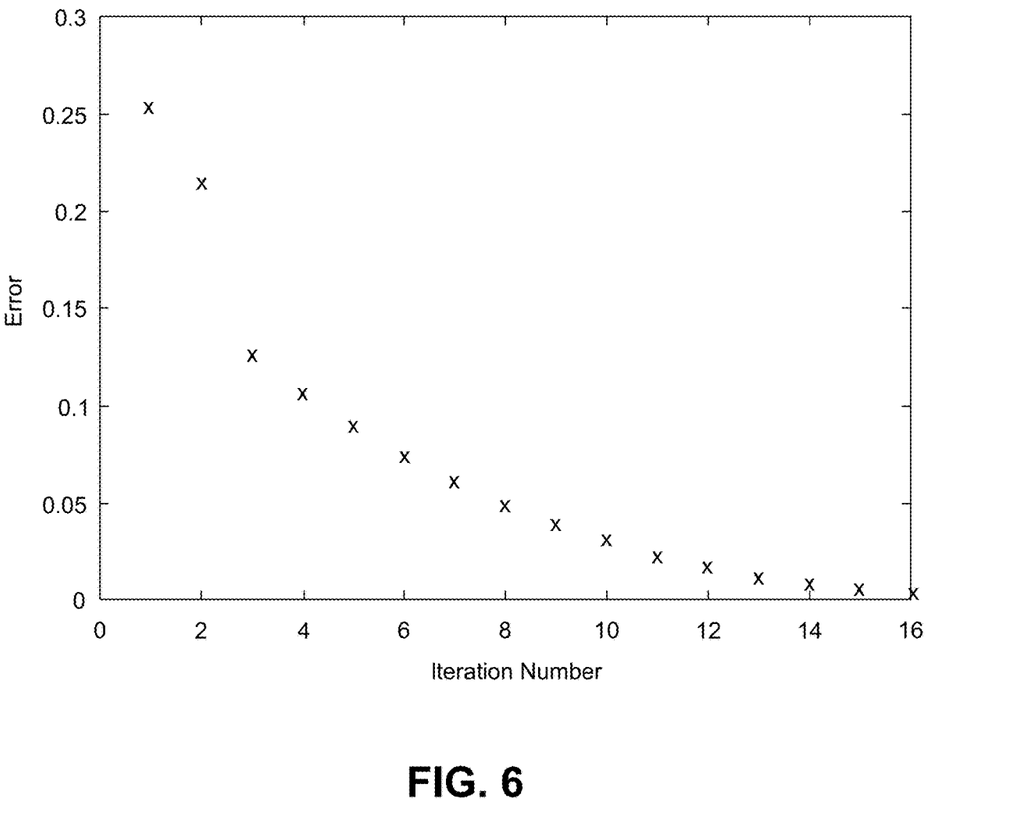
FIG. 6 illustrates error versus iteration number of the simulation of FIG. 5.

FIG. 6 demonstrates the error as a function of tune iteration of the ceramic filter response shown in FIG. 5. All tune operations must be positive. This results in a decrease in capacitance. In a preferred embodiment, the capacitors are initially under-tuned. Alternatively, the capacitors exhibit a capacitance exceeding the target. As depicted in FIG. 6, the solution converges well to within the desired tolerance.

Figure 7:
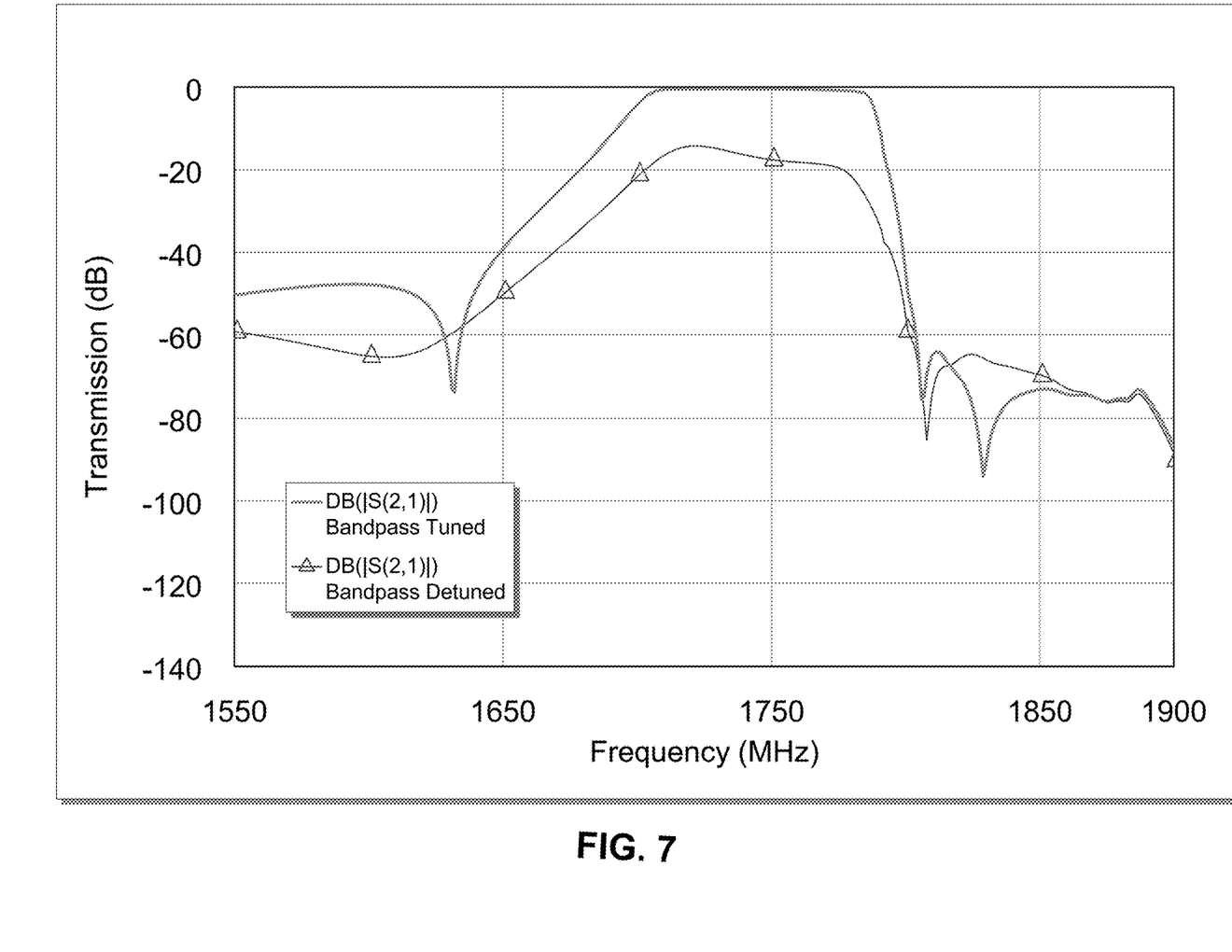
FIG. 7 illustrates modelling of an exemplary bandpass filter according to an aspect of the application.

FIG. 7 illustrates an exemplary embodiment of a bandpass filter and how the above-mentioned algorithm in this application should theoretically perform. In particular, FIG. 7 illustrates a tuned and detuned bandpass. The tuned bandpass is represented by the solid line. The detuned bandpass is represented by the line with intermittent triangles.

Figure 8:
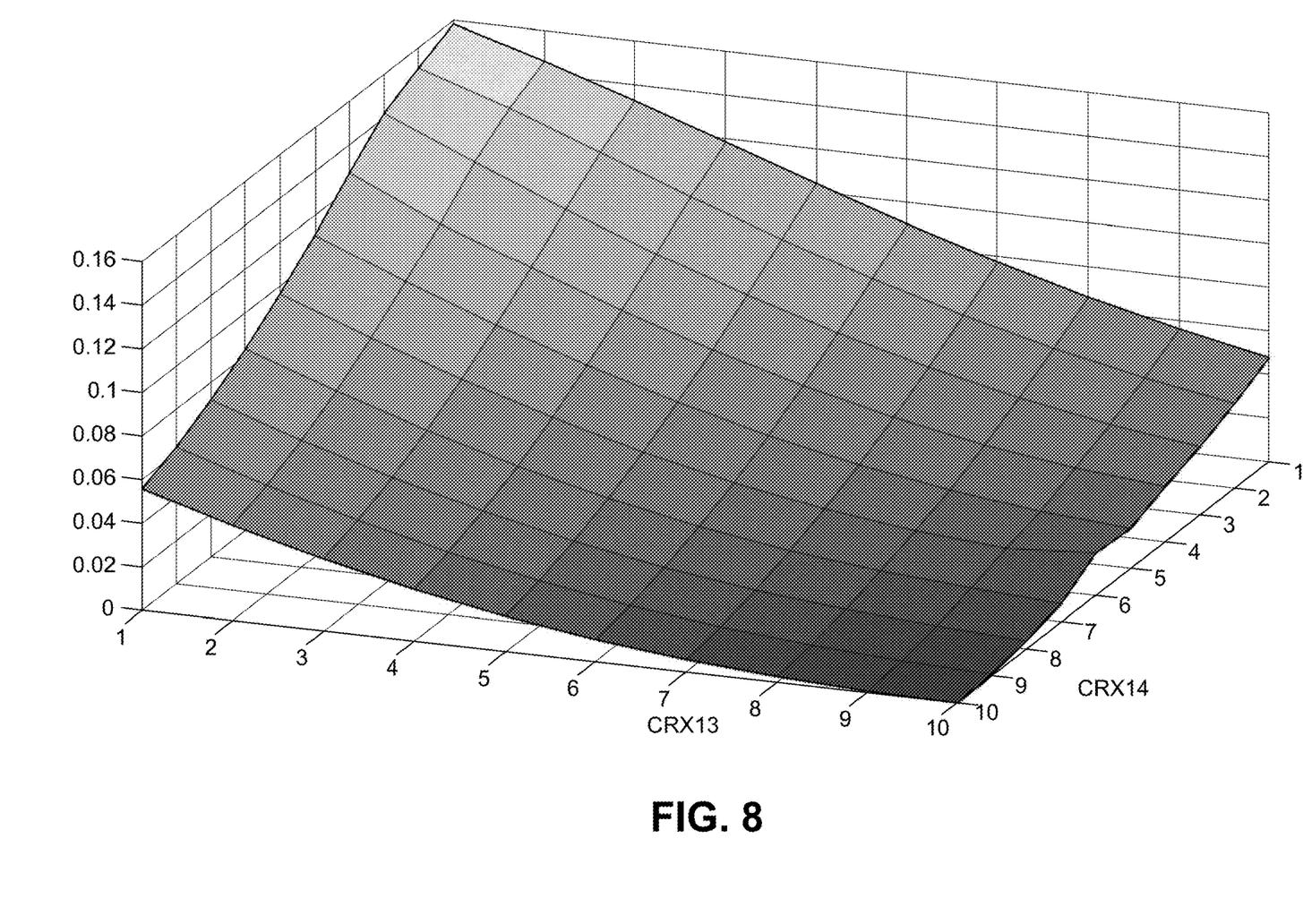
FIG. 8 illustrates a fixed step size sweep of the two capacitors in FIG. 5.

FIG. 8 illustrates a fixed step size sweep of two capacitor variables. Smooth convergence on minima (L2 norm error) in view of the ceramic filter illustrated in FIG. 5. FIG. 8 demonstrates near-convexity around the optimal point, indicating that local perturbations should converge well to the global minima.

According to yet another aspect, the application demonstrates capability with multiple variables, and can overcome the phenomena of eigenvalue crossing. Given two matrices, each assumed to be part of an iterative sequence, it is necessary to sort their respective eigenvalues accordingly. It is impossible to ensure proper eigenvalue order when computed from the coupling matrix. If two matrices are sufficiently close, the proper ordering of the eigenvalues can be determined by comparison of the values and respective eigenvectors between the matrices. Sorting ensures that the L2 norm for error computation is accurate: if the objective eigenvalues are sorted improperly, the optimizer will attempt convergence of particular eigenvalues to incorrect targets. Because the system is iterative, and if the target and initial matrices are sufficiently close, then the initial sorting will be close enough to approximate the optimal solution until the proper sorting is achieved. As long as the optimizer does not overshoot the target, eventually it will discover the proper ordering of the values based on their respective proximity to the target eigenvalues. As demonstrated in FIG. 6, after iteration two the function drops as the proper eigenvalue ordering is discovered, resulting in minimal error. In practice, a more robust method of eigenvalue sorting will be implemented, by sorting based on perturbations local to resonant cavities.

The optimization routine required relatively few iterations to converge on a closed solution. For each step of the iteration, the coupling matrix must be derived for the initial state and for each small change to the tuning variables. Therefore, there are N+1 coupling matrices for each step to be defined, where N is the number of tunes or variables. Each coupling matrix requires approximately seven seconds to compute. If parallelized, each loop iteration may approach this limit, and a full tuning operation may be successfully completed in minutes or less, resulting in both an accurate and time-effective method for optimizing the resonant structure.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method of tuning a printed device comprising:
   measuring a frequency response of a target device and a device under tune (DUT);
   computing, based on the measured frequency response, a coupling matrix for the target device and a coupling matrix for the DUT;
   extracting eigenvalues for the coupling matrix of the target device and a first set of eigenvalues for the coupling matrix of the DUT, where the eigenvalues of the target device are different than the first set of eigenvalues of the DUT;
   tuning the DUT with a material removal source;

measuring a second set of eigenvalues of the DUT, where the second set of eigenvalues is different from the first set of eigenvalues of the DUT;

calculating a tune path for iterative convergence of the second or a subsequent set of eigenvalues of the DUT with the eigenvalues of the target device; and observing the iterative convergence of the DUT and the target device.

2. The method of claim 1, further comprising:

extracting eigenvectors for the coupling matrix of the target device and a first set of eigenvectors for the coupling matrix of the DUT;

measuring a second set of eigenvectors of the DUT; and calculating a tune path for iterative convergence of the second or a subsequent set of eigenvectors of the DUT with the eigenvectors of the target device.

3. The method of claim 1, wherein the eigenvalues of the target device are based on a number of resonators of the target device plus 2.

4. The method of claim 1, wherein the coupling matrices are representative of resonant center frequencies and resonator cross couplings.

5. The method of claim 1, wherein the iterative convergence is exhibited in less than 5 minutes.

6. The method of claim 1, wherein the iterative convergence is exhibited in less than about 1 minute.

7. The method of claim 1, wherein the tuned device is employed in wireless communications devices.

8. The method of claim 1, wherein the tuning step includes removing metal on pads of the DUT.

9. The method of claim 8, wherein the DUT includes a recessed top pattern, and the tuning step is performed on the recessed top pattern.

10. The method of claim 1, wherein the material removal source is a femto-second laser, and the femto-second laser emit pulses less than about 1 femto-second.

11. The method of claim 1, wherein the DUT is a ceramic filter.

12. A system comprising:

a material removal source;

a mechanical tuning mechanism coupled to the material removal source;

a computer, coupled to the mechanical tuning mechanism and configured to operate the mechanical tuning mechanism and the material removal source, the computer including:

a non-transitory memory having instructions stored thereon for tuning a device under tune (DUT); and a processor, operably coupled to the non-transitory memory, configured to execute the instructions including:

measuring a frequency response of a target device and the DUT;

computing a coupling matrix for the target device and a coupling matrix for the DUT;

extracting eigenvalues for the coupling matrix of the target device and a first set of eigenvalues for the coupling matrix of the DUT, where the eigenvalues of the target device are different than the first set of eigenvalues of the DUT;

positioning the material removal source to a first location of the DUT;

tuning the DUT with the material removal source;

measuring a second set of eigenvalues of the DUT; and observing an iterative convergence of the DUT and the target device.

13. The system of claim 12, wherein the material removal source is a femto-second laser, and the femto-second laser emit pulses less than about 1 pico-second.

14. The system of claim 12, wherein the eigenvalues of the target filter are based on a number of resonators of the target filter plus 2.

15. The system of claim 12, wherein the coupling matrices are representative of resonant center frequencies and resonator cross couplings.

16. The system of claim 12, wherein the iterative convergence is exhibited in less than about 5 minutes.

17. The system of claim 16, wherein the iterative convergence is exhibited in less than about 1 minute.

18. The system of claim 12, wherein the DUT is a ceramic filter.

19. The system of claim 12, wherein the tuning step includes removing metal on pads of the DUT.

20. The system of claim 12, wherein the processor is further configured to execute the instructions of calculating a tune path for iterative convergence of the second or a subsequent set of eigenvalues of the DUT with the eigenvalues of the target device.

* * * * *